Patented May 12, 1953

2,638,468

UNITED STATES PATENT OFFICE 2,638,468

COPPER-CONTAINING AZO DYESTUFFS

Walter Wehrli, Basel, Switzerland, assignor to Sandoz Limited, Basel, Switzerland, a Swiss firm No Drawing. Application January 16, 1951, Serial No. 206,311. In Switzerland August 24, 1944

6 Claims. (Cl. 260—145)

The present application is a continuation-in-part application of my copending application Ser. No. 604,727, filed on July 12, 1945 (now abandoned).

The present invention relates to copper containing azo dyestuffs dyeing cellulosic fibers in vivid blue to navy blue shades of good fastness properties.

It has been found that valuable copper containing azo dyestuffs can be obtained in trisazo dyestuffs of the formula

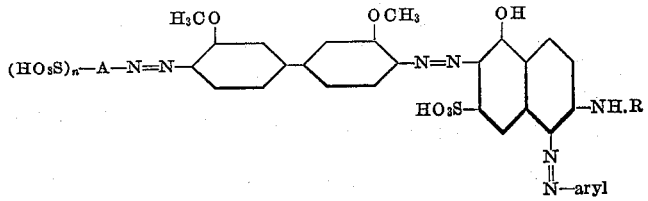

in which A stands for the radical of a compound of the naphthalene series having a hydroxy group in ortho-position to the azo bridge, R stands for a member selected from the group consisting of hydrogen, lower alkyl and a mononuclear radical of the benzene series, aryl stands for a radical selected from the group consisting of the benzene and naphthalene series and wherein $n$ is one of the integers one to three, are treated with copper-yielding substances.

The production of the trisazo dyestuffs takes place in the conventional manner and needs no further explanation.

The conversion into the complex copper compounds may be effected according to various methods known from the literature, for instance by heating in a slightly alkaline aqueous medium with copper oxide-ammonia complex in the presence or absence of organic bases or in the melt of alkaline metal salts of aliphatic monocarboxylic acids with copper salts. The coppering can be regarded as finished when the two methoxy groups derived from the 4:4-diamino-3:3'-dimethoxydiphenyl are split off.

The following data serve for a better illustration of the invention, no restriction of its scope being intended.

Instead of A the following compounds may for instance be used:

1-hydroxynaphthalene-4-sulfonic acid,
2-hydroxynaphthalene-6-sulfonic acid,
2-hydroxynaphthalene-4-sulfonic acid,
2-hydroxynaphthalene-7-sulfonic acid,
1-hydroxynaphthalene-3:6-disulfonic acid,
1-hydroxynaphthalene-3:8-disulfonic acid,
2-hydroxynaphthalene-3:6-disulfonic acid,
2-hydroxynaphthalene-6:8-disulfonic acid,
1 - hydroxy - 8 - chloro - naphthalene - 3:6 - disulfonic acid,
1 - hydroxy - 8 - methoxynaphthalene - 3:6 - disulfonic acid,
1-hydroxynaphthalene-3:6:8-trisulfonic acid,
1-hydroxynaphthalene-3:5:7-trisulfonic acid,
1:8-disydroxynaphthalene-3:6-disulfonic acid,
2-amino-5-hydroxynaphthalene-7-sulfonic acid,
2 - acetylamino - 5 - hydroxynaphthalene - 7-sulfonic acid,
2 - benzoylamino - 5 - hydroxynaphthalene - 7-sulfonic acid,
2 - phenylamino - 5 - hydroxynaphthalene - 7-sulfonic acid,
2-amino-8-hydroxynaphthalene-6-sulfonic acid,
2 - acetylamino - 8 - hydroxynaphthalene - 6-sulfonic acid,
1 - amino - 8 - hydroxynaphthalene - 3:6 - disulfonic acid,
1 - acetylamino - 8 - hydroxynaphthalene - 3:6-disulfonic acid,
1 - amino - 8 - hydroxynaphthalene - 2:4 - disulfonic acid,
1 - acetylamino - 8 - hydroxynaphthalene - 2:4-disulfonic acid,
2 - amino - 8 - hydroxynaphthalene - 3:6 - disulfonic acid,
2 - acetylamino - 8 - hydroxynaphthalene - 3:6-disulfonic acid,
1 - acetylamino - 8 - hydroxynaphthalene - 4-sulfonic acid.

"Aryl" can, for example, be derived from the following amines of the benzene or naphthalene series:

Aniline,
1-aminobenzene -2- or -3- or -4-sulfonic acid,
1-amino-2- or -3- or -4-chlorobenzene,
1-amino-2- or -3- or -4-methylbenzene,
1-amino-2:4- or -2:5- or -2:6-dimethylbenzene,
1-amino-2- or -3- or -4-methoxybenzene,
1-naphthylamine, 2-naphthylamine,
1-naphthylamine-4-sulfonic acid,
1-naphthylamine-6-sulfonic acid,
1-naphthylamine-7-sulfonic acid,
2-naphthylamine-1-sulfonic acid,
2-naphthylamine-6-sulfonic acid,
1-naphthylamine-3:6-disulfonic acid,
1-naphthylamine-3:8-disulfonic acid,
1-naphthylamine-4:8-disulfonic acid,
2-naphthylamine-3:6-disulfonic acid,
2-naphthylamine-4:8-disulfonic acid,
2-naphthylamine-5:7-disulfonic acid,
2-naphthylamine-6:8-disulfonic acid.

The following radicals may, for instance, stand for R:
-Methyl,
-Ethyl,
-Phenyl,
-2- or 3- or 4-methoxyphenyl,
-2- or 3- or 4-chlorophenyl,
-2- or 3- or 4-methylphenyl,
-3-carboxy-4-hydroxyphenyl,
-3- or 4-sulfophenyl,
-3- or 4-carboxyphenyl.

The following examples illustrate how the invention may be carried out in practice, but the examples are in no way limitative. The parts are given by weight.

*Example 1*

97.9 parts of the sodium salt of the trisazo dyestuff of the formula

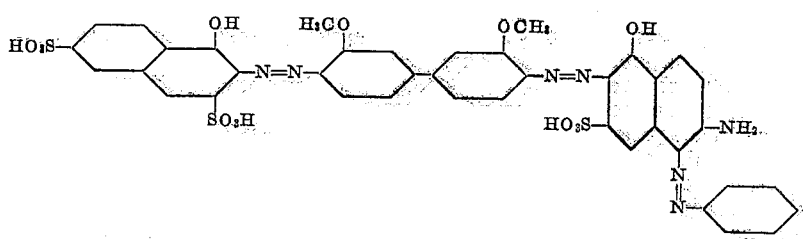

are dissolved in 2000 parts of water under addition of 20 parts of sodium carbonate. To this solution there are added, by portions at a temperature of 80–90° C. and while stirring 500 parts of an aqueous solution containing 50 parts of crystallised copper sulfate and 85 parts of a concentrated aqueous ammonia solution. The solution is stirred for 5 hours at 80–90° C., heated within 1 hour to boiling and boiled for 15 hours under reflux. The new complex copper compound thus obtained is salted out, filtered and dried. It is soluble in water with a blue coloration and in concentrated sulfuric acid with a bluish green coloration and dyes cotton and regenerated cellulose in clear blue shades, possessing very good fastness to light, to washing and to water.

*Example 2*

111 parts of the sodium salt of the trisazo dyestuff of the formula

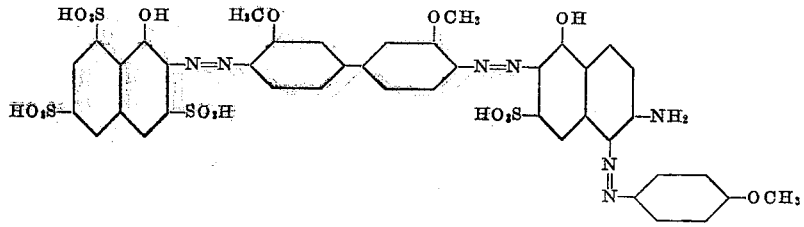

are dissolved in 2000 parts of water with addition of 20 parts of sodium carbonate. To this solution there are added, by portions, and while stirring at 80–90° C., 500 parts of an aqueous solution containing 50 parts of crystallised copper sulfate and 85 parts of a concentrated aqueous ammonia solution. The mixture is stirred for 5 hours at 80–90° C., heated within 1 hour to boiling and boiled for 15 hours under reflux. The complex copper compound thus obtained is salted out, filtered and dried. It is soluble in water with a blue coloration and in concentrated sulfuric acid with a bluish green coloration and dyes cotton and regenerated cellulose in blue shades, possessing very good fastness to light, to washing and to water.

*Example 3*

115.7 parts of the sodium salt of the trisazo dyestuff of the formula

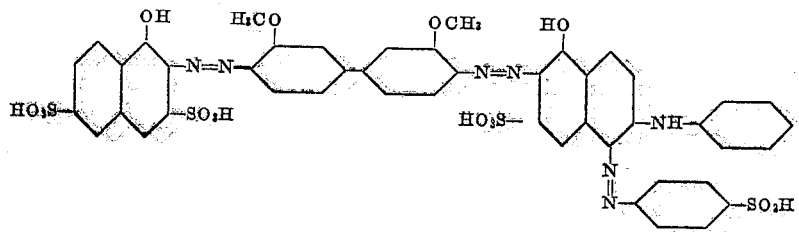

are added with vigorous stirring at 80–90° C. to the melt of 100 parts of water, 50 parts of crystalline copper sulfate and 350 parts of crystalline sodium acetate. The melt is stirred for 4 hours at 80–90° C., brought to boiling within 2 hours and boiled for further 10 hours under reflux. The melt is cooled down to 80° C., 750 parts of water dropped thereinto and the whole filtered and dried. The new copper complex dissolves in water with a vivid blue color and in concentrated sulfuric acid with bluish green color and cotton is dyed in vivid greenish blue shades of very good water, washing- and light-fastness.

Example 4

123.3 parts of the sodium salt of the trisazo dyestuff of the formula

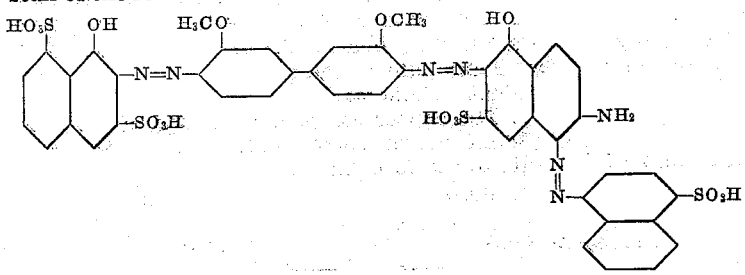

are dissolved in 2000 parts of water with addition of 20 parts of sodium carbonate. To this solution there are added, by portions, and while stirring at 80–90° C., 500 parts of an aqueous solution containing 50 parts of crystallised copper sulfate and 85 parts of a concentrated aqueous ammonia solution. The mixture is stirred for 5 hours at 80–90° C., heated within 1 hour to boiling and boiled for 15 hours under reflux. The complex copper compound thus obtained is salted out, filtered and dried. It is soluble in water with a blue coloration and in concentrated sulphuric acid with a bluish green coloration and dyes cotton and regenerated cellulose in blue shades, possessing very good fastness to light, to washing and to water.

Example 5

By replacing the starting dyestuff of Example 4

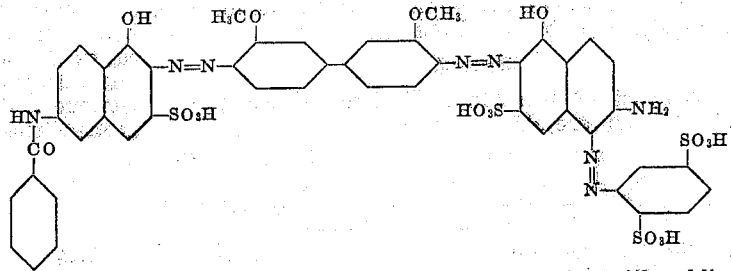

by the same quantity of the dyestuff of the formula

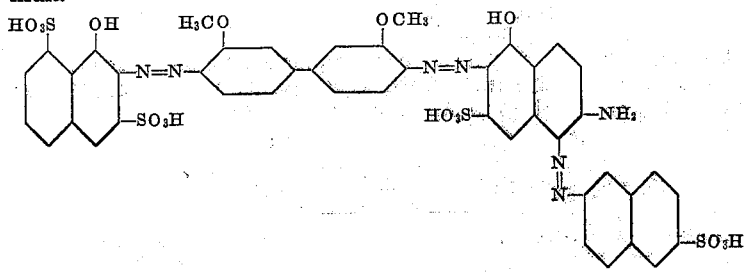

and otherwise proceeding in the manner described in the said example, a dyestuff of similar fastness properties is obtained.

Example 6

102 parts of the sodium salt of the trisazo dyestuff of the formula

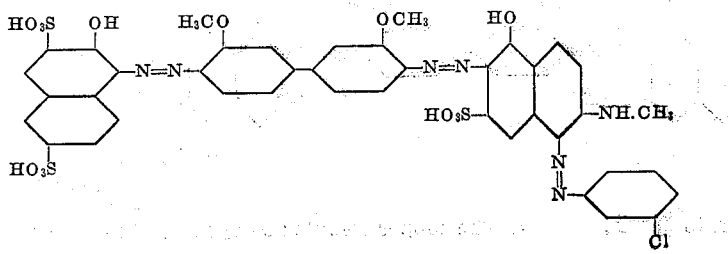

are dissolved in 2000 parts of water with addition of 20 parts of sodium carbonate and 150 parts of pyridine. To this solution there are added by portions at a temperature of 80–90° C. and while stirring 500 parts of an aqueous solution containing 50 parts of crystallised copper sulfate and 85 parts of a concentrated aqueous ammonia solution. The solution is stirred for 5 hours at 80–90° C., heated within 1 hour to boiling and boiled for 15 hours under reflux. The new complex copper compound thus obtained is salted out, filtered and dried. It is soluble in water with a reddish blue coloration and in concentrated sulfuric acid with a bluish green coloration and dyes cotton and regenerated cellulose in navy-blue shades, possessing very good fastness to light, to washing and to water.

Example 7

120 parts of the sodium salt of the trisazo dyestuff of the formula are dissolved in 2000 parts of water with addition of 20 parts of sodium carbonate and 100 parts of diethanolamine. To this solution there are added by portions and while stirring at 80–90° C., 500 parts of an aqueous solution containing 50 parts of crystallised copper sulfate and 85 parts of a concentrated aqueous ammonia solution. The mixture is stirred for 5 hours at 80–90° C., heated within 1 hour to boiling and boiled for 15 hours under reflux. The complex copper compound thus obtained is salted out, filtered and dried. It is soluble in water with a reddish-blue coloration and in concentrated sulfuric acid with a bluish green coloration and dyes cotton and regenerated cellulose in navy-blue shades, possessing very good fastness to light, to washing and to water.

*Example 8*

By replacing the starting dyestuff of Example 7 by the equivalent quantity of the dyestuff of the formula

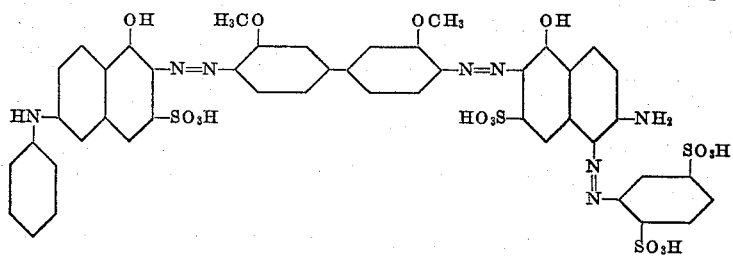

and otherwise proceeding in the same manner as described in the said example, a dyestuff of similar fastness properties is obtained.

*Example 9*

99.5 parts of the sodium salt of the trisazo dyestuff of the formula

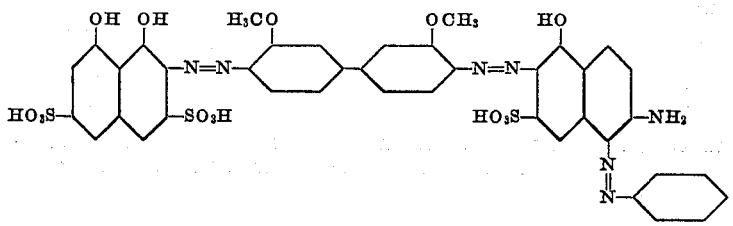

are added at a temperature of 80–90° C. and under vigorous stirring to the melt of 100 parts of water, 350 parts of crystalline sodium acetate and 50 parts of crystalline copper sulfate. The melt is stirred for 4 hours at 90° C., brought to boiling within 2 hours and boiled for further 10 hours under reflux. The melt is cooled down to 80° C., 750 parts of water are dropwise added thereto, the whole is filtered and the dyestuff dried. The new copper complex dissolves in water with a reddish-blue coloration and in concentrated sulfuric acid with a bluish green color and dyes cotton in navy blue shades of very good washing, water and light fastness.

What I claim is:

1. The copper complex compound of a trisazo dyestuff which corresponds in its copper-free state to the formula

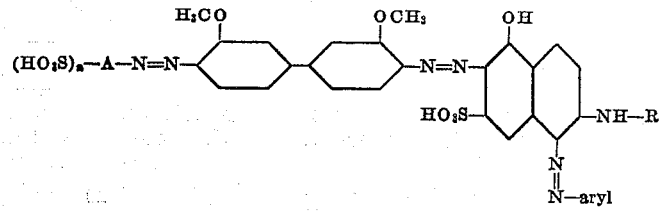

in which A stands for the radical of a compound of the napthalene series having a hydroxy group in ortho position to the azo bridge, R stands for a member selected from the group consisting of hydrogen, lower alkyl and a mononuclear radical of the benzene series, aryl stands for a radical selected from the group consisting of the benzene and naphthalene series and wherein $n$ is one of the integers one to three.

2. The copper complex compound of the trisazo dyestuff which corresponds in its copper-free state to the formula

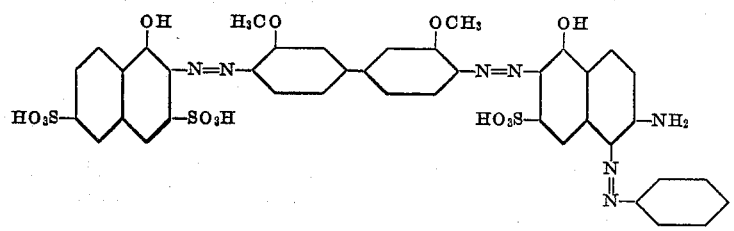

3. The copper complex compound of the trisazo dyestuff which corresponds in its copper-free state to the formula

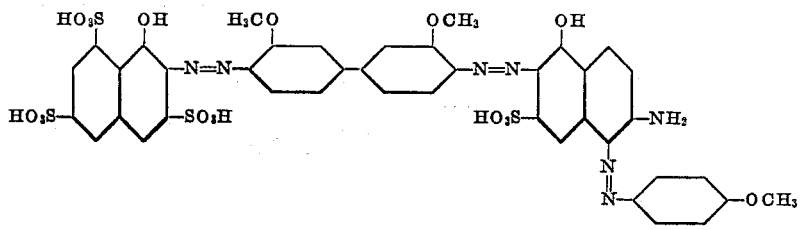

4. The copper complex compound of the trisazo dyestuff which corresponds in its copper-free state to the formula

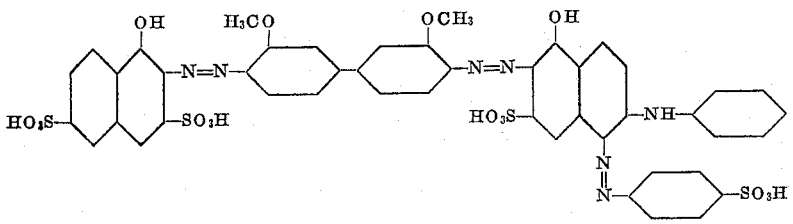

5. The copper complex compound of the trisazo dyestuff which corresponds in its copper-free state to the formula

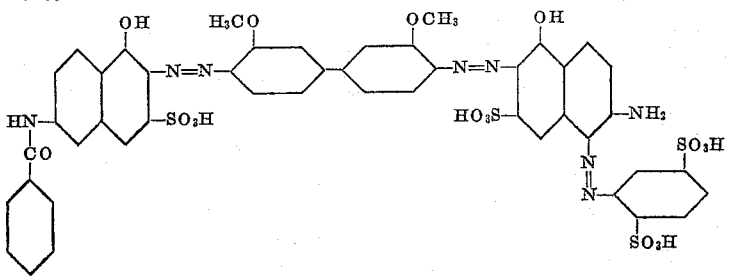

6. The copper complex compound of the trisazo dyestuff which corresponds in its copper-free state to the formula

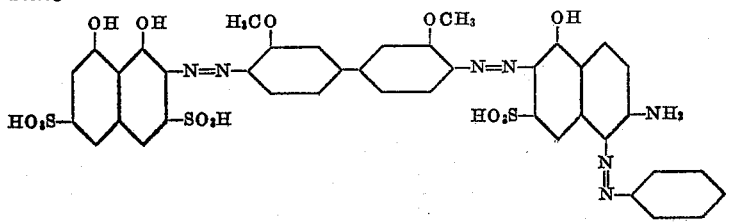

WALTER WEHRLI.

References Cited in the file of this patent

UNITED STATES PATENTS

| Number | Name | Date |
|---|---|---|
| 2,370,500 | Sparks | Feb. 27, 1945 |
| 2,390,480 | West | Dec. 4, 1945 |

FOREIGN PATENTS

| Number | Country | Date |
|---|---|---|
| 4,703 | Great Britain | of 1897 |